US008899390B2

(12) United States Patent
Kearsey et al.

(10) Patent No.: US 8,899,390 B2
(45) Date of Patent: Dec. 2, 2014

(54) FREEWHEELING ROTARY DAMPING MECHANISM

(71) Applicant: C&D Zodiac, Inc., Huntington Beach, CA (US)

(72) Inventors: Stephen Kearsey, Wheathampstead (GB); Richard McClure, Huntington Beach, CA (US)

(73) Assignee: C&D Zodiac, Inc., Huntington Beach, CA (US)

( * ) Notice: Subject to any disclaimer, the term of this patent is extended or adjusted under 35 U.S.C. 154(b) by 138 days.

(21) Appl. No.: 13/765,358

(22) Filed: Feb. 12, 2013

(65) Prior Publication Data

US 2013/0207529 A1    Aug. 15, 2013

Related U.S. Application Data

(60) Provisional application No. 61/598,836, filed on Feb. 14, 2012.

(51) Int. Cl.
| | | |
|---|---|---|
| *F16D 57/02* | (2006.01) | |
| *F16F 9/32* | (2006.01) | |
| *A47B 46/00* | (2006.01) | |
| *F16F 9/14* | (2006.01) | |
| *B64D 11/00* | (2006.01) | |

(52) U.S. Cl.
CPC ............. *F16F 9/3207* (2013.01); *A47B 46/00* (2013.01); *F16F 9/145* (2013.01); *B64D 11/003* (2013.01)
USPC ........................................ 188/291

(58) Field of Classification Search
USPC ............. 312/248, 249.7; 248/311.2; 188/290, 188/291
See application file for complete search history.

(56) References Cited

U.S. PATENT DOCUMENTS

| 4,840,084 A | 6/1989 | Durham |
| 5,064,361 A | 11/1991 | Kristof et al. |

(Continued)

FOREIGN PATENT DOCUMENTS

| EP | 1420138 A1 | 5/2004 |
| EP | 1681490 A1 | 7/2006 |

(Continued)

OTHER PUBLICATIONS

International Search Report and Written Opinion issued on Apr. 19, 2013 in related PCT/US2013/025945 application.

*Primary Examiner* — Vicky Johnson
(74) *Attorney, Agent, or Firm* — Brennan C. Swain, Esq.; Jeffer Mangels Butler & Mitchell LLP

(57) ABSTRACT

A damping mechanism that includes a housing with an inner circumferential surface defined by an assembly outer race, an axle shaft that is rotatable with respect to the housing, and a transmission assembly operatively associated with the axle shaft and disposed within the housing. The transmission assembly includes an assembly intermediate race. A fluid space that includes fluid therein is defined between the assembly intermediate race and the inner circumferential surface of the assembly outer race. A vane is disposed between the assembly intermediate race and the inner circumferential surface of the assembly outer race. The vane includes a restriction space defined therein. When the axle shaft rotates in the first direction, the transmission assembly transmits rotation from the axle shaft to the vane, and when the axle shaft rotates in the second direction, the transmission assembly transmits less rotation to the first vane than when the axle shaft rotates in the first direction.

15 Claims, 2 Drawing Sheets

(56) References Cited

U.S. PATENT DOCUMENTS

| | | | |
|---|---|---|---|
| 5,090,521 A * | 2/1992 | Miura | 188/82.1 |
| 5,449,054 A * | 9/1995 | Wiese et al. | 188/296 |
| 5,460,252 A * | 10/1995 | Kosugi et al. | 188/291 |
| 5,651,536 A | 7/1997 | Daul | |
| 5,697,122 A * | 12/1997 | Okabe et al. | 16/82 |
| 5,706,551 A | 1/1998 | Jeynes et al. | |
| 5,837,911 A | 11/1998 | Inoue | |
| 5,863,134 A | 1/1999 | Chen | |
| 5,887,930 A | 3/1999 | Klein | |
| 5,934,615 A | 8/1999 | Treichler | |
| 6,000,069 A | 12/1999 | Sorimachi | |
| 6,079,102 A | 6/2000 | Miller | |
| 6,085,384 A | 7/2000 | Bivens | |
| 6,164,592 A | 12/2000 | Stephan et al. | |
| 6,173,822 B1 | 1/2001 | Korb | |
| 6,725,984 B2 | 4/2004 | Orita | |
| 7,111,712 B2 | 9/2006 | Orita | |
| 7,322,450 B2 | 1/2008 | Orita | |
| 7,416,063 B2 | 8/2008 | Araki et al. | |
| 7,428,952 B2 | 9/2008 | Miyamoto | |
| 7,510,062 B2 | 3/2009 | Derr | |
| 7,562,416 B2 | 7/2009 | Lautenschlager et al. | |
| 7,712,186 B2 | 5/2010 | Kang | |
| 7,828,127 B2 | 11/2010 | Jeffries | |
| 7,836,550 B2 | 11/2010 | Lin | |
| 7,850,219 B2 | 12/2010 | Townson et al. | |
| 8,096,393 B2 | 1/2012 | Saito et al. | |
| 8,356,977 B2 * | 1/2013 | Jones et al. | 416/107 |
| 8,757,337 B2 * | 6/2014 | Kojima et al. | 188/290 |
| 2002/0179258 A1 | 12/2002 | Welfonder | |
| 2003/0106898 A1 | 6/2003 | Kennedy | |
| 2006/0282982 A1 | 12/2006 | Kim | |
| 2007/0018043 A1 * | 1/2007 | Lamoree et al. | 244/118.1 |
| 2009/0025181 A1 | 1/2009 | Burger | |
| 2010/0038196 A1 | 2/2010 | Krammer | |
| 2011/0139929 A1 | 6/2011 | Young | |
| 2011/0214354 A1 | 9/2011 | Talpe | |
| 2011/0225768 A1 | 9/2011 | Haemmerle | |
| 2011/0226573 A1 | 9/2011 | Kojima | |

FOREIGN PATENT DOCUMENTS

| | | |
|---|---|---|
| EP | 2029844 B1 | 10/2010 |
| FR | 2754856 A1 | 4/1998 |

* cited by examiner

FREEWHEELING ROTARY DAMPING MECHANISM

CROSS REFERENCE TO RELATED APPLICATIONS

This application claims the benefit of U.S. Provisional Application No. 61/598,836, filed Feb. 14, 2012, which is herein incorporated by reference in its entirety.

FIELD OF THE INVENTION

The present invention relates generally to rotary damping mechanisms, and, more particularly, to a freewheeling rotary damping mechanism with fixed vanes.

BACKGROUND OF THE INVENTION

Conventional damping mechanisms provide resistance in the opening direction for a controlled descent of a pivoting overhead stowage bin bucket when loaded with luggage. However, prior art damping mechanisms in commercial aircraft overhead stowage bins are often bulky and take up a large amount of space. Furthermore, prior art damping mechanisms typically have an angular working range that is less than 360°.

SUMMARY OF THE PREFERRED EMBODIMENTS

In accordance with a first aspect of the present invention there is provided a damping mechanism that includes a housing with an inner circumferential surface defined by an assembly outer race, a housing that has an inner circumferential surface and that defines a housing interior, an axle shaft that is rotatable with respect to the housing in a first direction and a second direction and a transmission assembly operatively associated with the axle shaft and disposed at least partially within the housing interior. The transmission assembly includes an assembly intermediate race that has an outer circumferential surface, and a fluid space is defined between the outer circumferential surface of the assembly intermediate race and the inner circumferential surface of the assembly outer race. The damping mechanism also includes a volume of fluid disposed in the fluid space, and at least a first vane disposed between the assembly intermediate race and the inner circumferential surface of the assembly outer race. The first vane includes a first restriction space defined therein at a location between the outer circumferential surface of the assembly intermediate race and the inner circumferential surface of the assembly outer race. When the axle shaft rotates in the first direction, the transmission assembly transmits rotation from the axle shaft to the first vane. When the axle shaft rotates in the second direction, the transmission assembly transmits less rotation to the first vane than when the axle shaft rotates in the first direction. In a preferred embodiment, the transmission assembly transmits no rotation to the first vane when the axle shaft rotates in the second direction. Preferably, the first restriction space is defined between a distal end of the first vane and the inner circumferential surface of the assembly outer race. In a preferred embodiment, the damping mechanism includes at least a second vane disposed between the assembly intermediate race and the inner circumferential surface of the assembly outer race. The second vane includes a second restriction space defined therein. Preferably, the second restriction space is defined between a distal end of the second vane and the inner circumferential surface of the assembly outer race. In a preferred embodiment, the transmission assembly includes an assembly inner race that transmits rotation of the axle shaft in the first direction to the assembly intermediate race.

In accordance with another aspect of the present invention there is provided a damping mechanism that includes a housing that includes an assembly outer race that defines an inner circumferential surface and that defines a housing interior, an axle shaft that is rotatable with respect to the housing in a first direction and a second direction, and a transmission assembly that is operatively associated with the axle shaft and disposed at least partially within the housing interior. The transmission assembly includes an assembly intermediate race that has an outer circumferential surface. A fluid space is defined between the outer circumferential surface of the assembly intermediate race and the inner circumferential surface of the assembly outer race. A volume of fluid disposed in the fluid space. The damping mechanism also includes at least a first vane having a distal end extending outwardly from the assembly intermediate race. A first restriction space is defined between the distal end of the first vane and the inner circumferential surface of the assembly outer race. When the axle shaft rotates in the first direction, the transmission assembly transmits rotation from the axle shaft to the first vane, and wherein when the axle shaft rotates in the second direction, the transmission assembly transmits less rotation to the first vane than when the axle shaft rotates in the first direction. In a preferred embodiment, the transmission assembly transmits no rotation to the first vane when the axle shaft rotates in the second direction.

In accordance with yet another aspect of the present invention there is provided a method that includes the steps of obtaining a damping mechanism that includes a housing that defines a housing interior and has an inner circumferential surface and a volume of fluid disposed therein, rotating an axle shaft in a first direction and transmitting the rotation of the axle shaft to a first vane that is positioned within the volume of fluid, and rotating the axle shaft in second direction and not transmitting the rotation of the axle shaft to the first vane. The first vane includes a first restriction space defined therein at a location between the transmission assembly and the inner circumferential surface of the housing. In a preferred embodiment, a portion of the volume of fluid is forced through the first restriction space when the axle shaft is rotated in the first direction. In use, the housing is affixed to a first object and the axle shaft is affixed to a second object, and the first and second objects are pivotal with respect to one another. Preferably, the first object is stationary and the second object pivots with respect to the first object.

In accordance with another aspect of the present invention, there is provided an overhead stowage bin that includes an upper portion and a bucket that cooperate to define a bin interior, and at least one damping mechanism. The axle shaft of the damping mechanism is secured to one of the upper portion or the bucket, and the housing of the damping mechanism is secured to the other of the upper portion or the bucket. The bucket can pivot with respect to the upper portion.

In a preferred embodiment, from the centerline outwards, the rotary damping mechanism or damper assembly is comprised of an axle, an assembly inner race engaged with the axle, a clutch bearing inner race affixed to the assembly inner race, an assembly intermediate race affixed to the clutch bearing outer race, windage vanes integral with the intermediate race, damping fluid, and an outer race forming the housing. The clutch bearing is a freewheeling device positioned between the assembly inner and intermediate races that engages in one rotational direction only, while freewheeling in the other. In a first direction, the clutch bearing engages and rotates the inner and intermediate races together with the rigid windage vanes. The vanes, being immersed in a damping fluid resist the rotation of the axle, providing resistance and effectively damping the rotation. In a second direction, the clutch bearing freewheels, disengaging the assembly inner and intermediate races, allowing the axle and inner races to rotate freely without moving the fixed windage vanes. No resistance is afforded as a result from the damping fluid.

It will be appreciated by those of ordinary skill in the art that varying the fluid viscosity can provide greater or lesser damping. Varying the windage vane length and hence the gap between the distal free end of the vane and the outer race inner circumferential surface can also provide greater or lesser damping. Varying the number of vanes can also affect the damping. The vanes can also have orifices to affect the damping.

In summary, in the first direction, the windage vanes are rotated through fluid, which causes rotational damping. In the second direction, the windage vanes are stationary with no rotational damping, allowing the axle to spin freely.

When used with an overhead stowage bin having a bucket, the assembly provides desired damping in the bucket opening direction, while "freewheeling," and providing little to no damping in the closing direction.

DETAILED DESCRIPTION OF THE PREFERRED EMBODIMENTS

Figure 1:
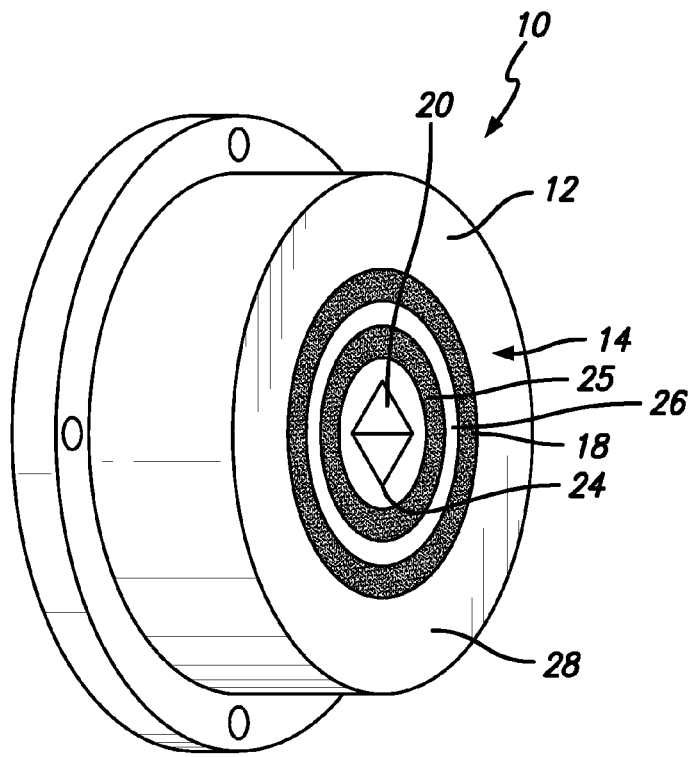
FIG. 1 is a perspective view of a rotary damping mechanism in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-4 show an embodiment of a rotary damping mechanism 10. The rotary damping mechanism 10 is used with an overhead stowage bin on a commercial passenger aircraft. However, this is not a limitation on the present invention and the rotary damping mechanism 10 can be used elsewhere.

Figure 2:
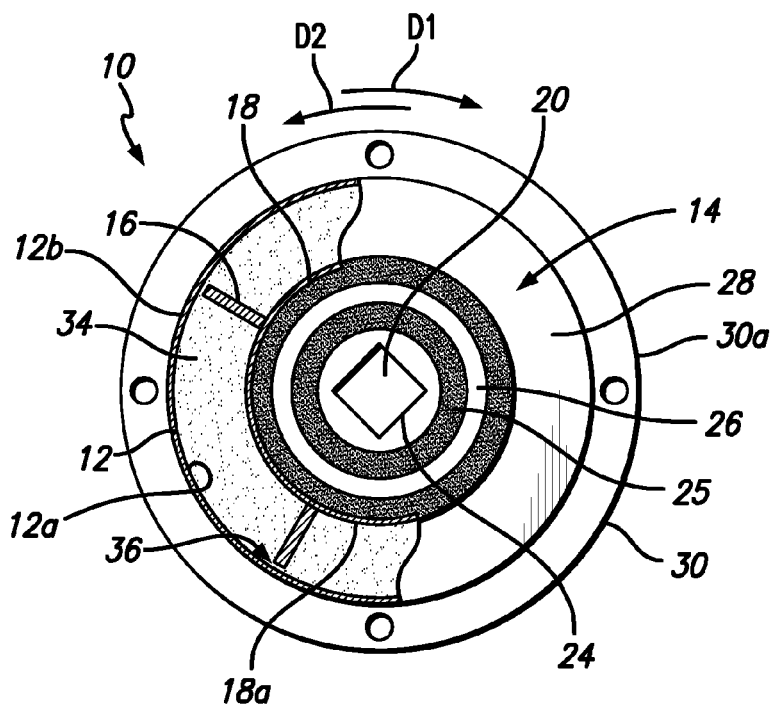
FIG. 2 is an elevational view of the rotary damping mechanism of FIG. 1 with a portion in cross-section to show the interior.
Figure 3:
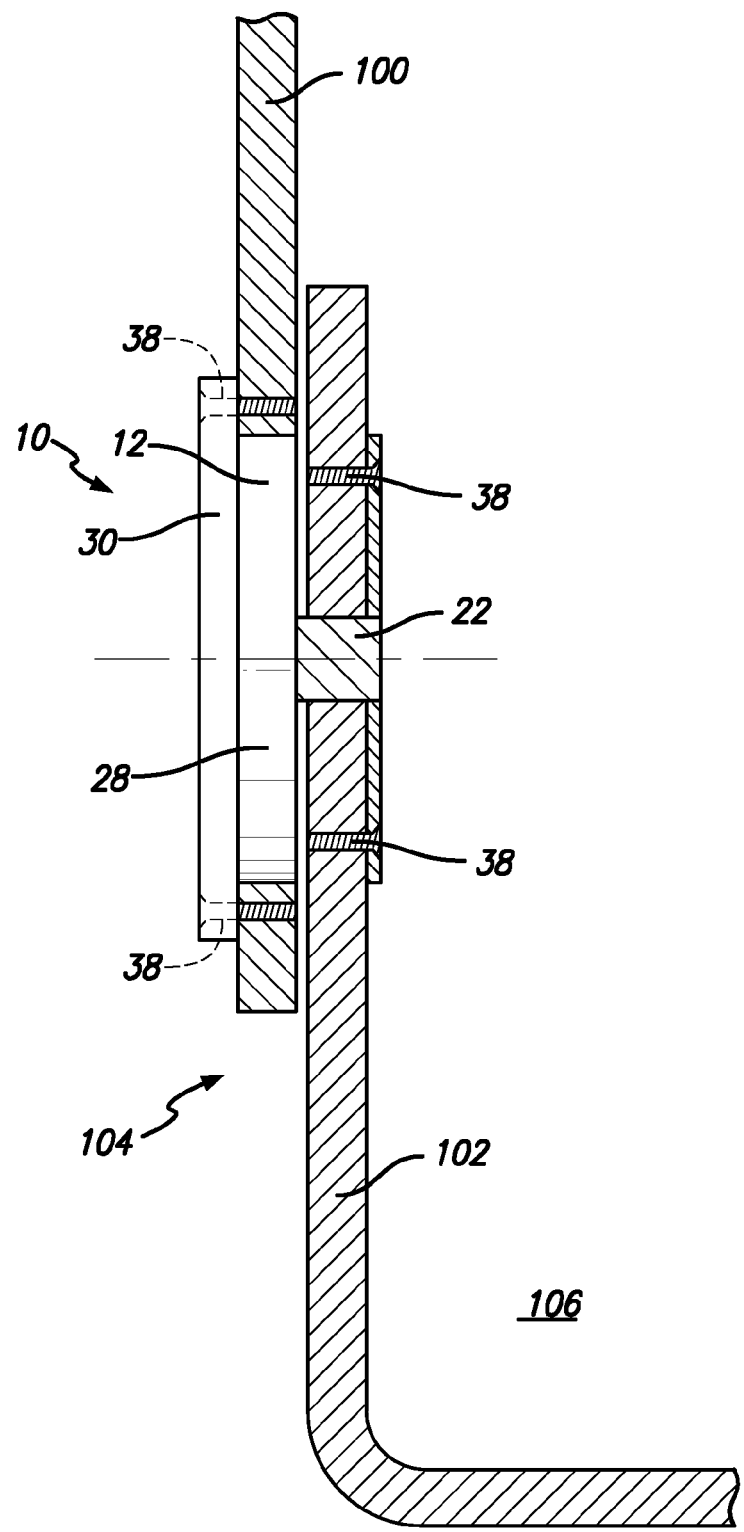
FIG. 3 is a side elevational view of the rotary damping mechanism of FIG. 1 secured to a first object and a second object such that it can provide damping of the rotation of the second object when it rotates in the first direction.

As shown in FIGS. 1-3, in a preferred embodiment, the rotary damping mechanism 10 provides damping in one rotational direction (the first direction D1), while providing little to no damping in the other rotational direction (the second direction D2). As shown in FIGS. 1-3, the rotary damping mechanism 10 includes a housing 12, a transmission assembly 14, and at least one vane 16 that is mounted on an assembly intermediate race 18 of the transmission assembly 14. In a preferred embodiment, the rotary damping mechanism 10 includes more than one vane 16. As many vanes as desired can be included.

As is shown in FIG. 1, in a preferred embodiment, housing 12 includes an axle opening 20 defined therethrough. In use, an axle shaft is received in axle opening 20 and any rotation of the axle is imparted to the transmission assembly 14. The transmission assembly 14 is configured such that rotation of the axle shaft 22 in the first direction is transmitted from the axle shaft 22 to the assembly intermediate race 18 and the vanes 16 via the transmission assembly 14. The transmission assembly 14 is configured such that rotation of the axle shaft 22 in the second direction is not transmitted to the assembly intermediate race 18 and the vanes 16. Therefore, when the axle shall 22 rotates in the first direction D1 the assembly intermediate race 18 and vanes 16 rotate therewith. When the axle shaft 22 rotates in the second direction D2 the assembly intermediate race 18 and vanes 16 do not rotate therewith. In a preferred embodiment, the transmission assembly 14 includes an assembly inner race 24 engaged with the axle, a clutch bearing inner race 25 affixed to the assembly inner race 24, a clutch bearing outer race 26 and the assembly intermediate race 18 affixed to the clutch bearing outer race 26. Rotation of the axle shall 22, rotates the assembly inner race 24 and the clutch bearing inner race 25. Internal gearing or the like between the assembly inner race 24 and the assembly intermediate race 18 (provided in an embodiment by the clutch bearing) transmits rotation from the axle shaft 22 to the assembly intermediate race 18 (and the vanes 16) when the axle shaft 22 rotates in the first direction D1. When the axle shaft 22 rotates in the second direction D2, the rotation is not transmitted to the assembly intermediate race 18 and the integral vanes 16. FIG. 1 shows a portion of the transmission assembly 14 open to the exterior of the housing 12. However, in another embodiment, they can be completely housed within the housing interior.

The transmission assembly 14 described herein is only exemplary. Any type of one way clutch mechanism or freewheel can be used to provide the rotational transmission discussed above. For example, see U.S. Pat. No. 4,840,084 to Durham, which is incorporated by reference in its entirety herein.

In a preferred embodiment, housing 12 includes a first portion 28 and a second portion 30 that cooperate to define a housing interior 32 that houses the transmission assembly 14, vanes 16 and a volume of damping fluid 34. The first portion 28 and second portion 30 can be unitary or be separate pieces. In a preferred embodiment, the second portion 30 of the housing 12 includes a flange 30a with openings therein for connecting the housing 12 to an object. However, this is not a limitation on the present invention and the housing 12 can be connected to an object in other ways. For example, the housing 12 can be glued within an opening.

As shown in FIG. 2, the vanes 16 extend radially outwardly from an outer circumferential surface 18a of the assembly intermediate race 18 and into the volume of fluid 34. In another embodiment, the vanes 16 can extend at an angle. As shown in FIG. 2, the housing 12 includes a cylindrical portion that is essentially the assembly outer race 12b. In a preferred embodiment, with respect to each vane 16, a restriction space 36 is defined between the outer circumferential surface 18a of the assembly intermediate race 18 and the inner circumferential surface 12a of the assembly outer race 12b. As shown in FIG. 2, in a preferred embodiment, the restriction space 36 is defined between the distal end of the vane 16 and the inner circumferential surface 12a of the assembly outer race 12b. However, this is not a limitation on the present invention. In another embodiment, the restriction space can be an orifice defined in the vane 16. In another embodiment, the outer circumferential surface 18a of the assembly intermediate race 18 can include a vane extending radially outwardly therefrom and the inner circumferential surface 12a of the assembly outer race 12b can include a vane extending radially inwardly therefrom. The restriction space can be defined between these vanes. In other words, the vane 16 can have a gap in it. As will be described below, when the axle shaft 22 rotates in the first direction D1, the restriction space 36 allows fluid 34 to pass therethrough, but, due to the reduced volume in a circumferential direction provides damping compared to rotation in the second direction D2 (when the vanes 16 do not rotate).

In use in a commercial aircraft, the first direction D1 would likely be the opening of the overhead stowage bin 104 and the second direction D2 would likely be the closing of the overhead stowage bin 104. Therefore, when the bin interior 106 is full of luggage and it is opened, the damping provides a controlled descent. For example, the housing 12 can be affixed to the stationary upper portion 100 of the overhead stowage bin 104 (the first object) and the axle shaft 22 can be affixed to the lower, pivoting portion of the overhead stowage bin 104 (the bucket 102 or second object). Therefore, when the bucket 102 pivots downwardly (is opened), the axle shaft 22 rotates, which causes, in turn, the assembly inner race 24 and the assembly intermediate race 18 together with the vanes 16 to rotate. As a result of the small restriction space 36 that the fluid has to pass through, damping occurs in the opening direction. However, when the bucket is closed, the "freewheel" design of the transmission assembly 14 causes the assembly inner race 24 to rotate relative to the assembly intermediate race 18, the vanes 16 and the fluid 34, which remain generally stationary. Therefore little to no damping occurs in the closing direction. The rotary damping mechanism 10 provides rotation up to a full 360°. In another embodiment, the housing 12 can be affixed to the bucket, and the axle shaft 22 can be affixed to the stationary upper portion of the pivot bin. It will be appreciated that a single overhead stowage bin 104 will typically include two rotary damping mechanisms 10; one on each side. FIG. 3 shows the rotary damping mechanism 10 attached via threaded fasteners 38. However, this is not a limitation on the present invention. The axle shaft 22 can extend through one or both of the first portion 28 or the second portion 30 of the housing 12. As will be appreciated by those of ordinary skill in the art, the axle shaft 22 can include a flat surface, key or the like or can be polygonal such that rotation can be transferred from the pivoting object to the axle shaft.

The rotary damping mechanism 10 can be applied to any axis that requires different damping rates in either direction (lavatory doors, overhead stowage bin doors/buckets for example). In another embodiment, the transmission assembly can include a gear ratio such that it transmits more rotation to the vanes when the axle shaft rotates in the first direction than it does when the axle shaft rotates in the second direction. This provides more damping in the first direction (e.g., opening of a pivot bin) than in the second direction (e.g., closing of a pivot bin).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to," As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can housed.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A damping mechanism comprising:
  a housing that includes an assembly outer race that includes an inner circumferential surface, wherein the housing defines a housing interior,
  an axle shaft that is rotatable with respect to the housing in a first direction and a second direction,
  a transmission assembly operatively associated with the axle shaft and disposed at least partially within the housing interior, wherein the transmission assembly includes an assembly intermediate race that has an outer circumferential surface, and wherein a fluid space is defined between the outer circumferential surface of the assembly intermediate race and the inner circumferential surface of the assembly outer race,
  a volume of fluid disposed in the fluid space, and
  at least a first vane disposed between the assembly intermediate race and the inner circumferential surface of the assembly outer race, wherein the first vane includes a first restriction space defined therein at a location between the outer circumferential surface of the assembly intermediate race and the inner circumferential surface of the assembly outer race,
  wherein when the axle shaft rotates in the first direction, the transmission assembly transmits rotation from the axle shaft to the first vane, and wherein when the axle shaft rotates in the second direction, the transmission assembly transmits less rotation to the first vane than when the axle shaft rotates in the first direction.

2. The damping mechanism of claim 1 wherein the transmission assembly transmits no rotation to the first vane when the axle shaft rotates in the second direction.

3. The damping mechanism of claim 2 wherein the first restriction space is defined between a distal end of the first vane and the inner circumferential surface of the assembly outer race.

4. The damping mechanism of claim 1 further comprising at least a second vane disposed between the assembly intermediate race and the inner circumferential surface of the assembly outer race, wherein the second vane includes a second restriction space defined therein.

5. The damping mechanism of claim 4 wherein the first restriction space is defined between a distal end of the first vane and the inner circumferential surface of the assembly outer race, and wherein the second restriction space is defined between a distal end of the second vane and the inner circumferential surface of the assembly outer race.

6. The damping mechanism of claim 1 wherein the transmission assembly includes an assembly inner race that transmits rotation of the axle shaft in the first direction to the assembly intermediate race.

7. The damper mechanism of claim 1 further comprising a flange extending radially outwardly from the housing, wherein the flange includes at least one attachment opening defined therein.

8. The damper mechanism of claim 7 wherein the flange is an annular flange.

9. A damping mechanism comprising:
  a housing that includes an assembly outer race that includes an inner circumferential surface, wherein the housing defines a housing interior,
  an axle shaft that is rotatable with respect to the housing in a first direction and a second direction,
  a transmission assembly operatively associated with the axle shaft and disposed at least partially within the housing interior, wherein the transmission assembly includes an assembly intermediate race that has an outer circumferential surface, and wherein a fluid space is defined between the outer circumferential surface of the assembly intermediate race and the inner circumferential surface of the assembly outer race,
  a volume of fluid disposed in the fluid space, and at least a first vane having a distal end extending outwardly from the assembly intermediate race, wherein a first restriction space is defined between the distal end of the first vane and the inner circumferential surface of the assembly outer race, wherein when the axle shaft rotates in the first direction, the transmission assembly transmits rotation from the axle shaft to the first vane, and wherein when the axle shaft rotates in the second direction, the transmission assembly transmits less rotation to the first vane than when the axle shaft rotates in the first direction.

10. The damping mechanism of claim 9 wherein the transmission assembly transmits no rotation to the first vane when the axle shaft rotates in the second direction.

11. The damping mechanism of claim 10 wherein the first vane extends radially outwardly from the assembly intermediate race.

12. The damping mechanism of claim 11 further comprising at least a second vane having a distal end extending outwardly from the assembly intermediate race, wherein a second restriction space is defined between the distal end of the second vane and the inner circumferential surface of the assembly outer race.

13. An overhead stowage bin comprising:
an upper portion,
a bucket, wherein the bucket and the upper portion combine to define a bin interior, and
at least one damping mechanism that includes
a housing that includes an assembly outer race that includes an inner circumferential surface, wherein the housing defines a housing interior,
an axle shaft that is rotatable with respect to the housing in a first direction and a second direction,
a transmission assembly operatively associated with the axle shaft and disposed at least partially within the housing interior, wherein the transmission assembly includes an assembly intermediate race that has an outer circumferential surface, and wherein a fluid space is defined between the outer circumferential surface of the assembly intermediate race and the inner circumferential surface of the assembly outer race,
a volume of fluid disposed in the fluid space, and
at least a first vane disposed between the assembly intermediate race and the inner circumferential surface of the assembly outer race, wherein the first vane includes a first restriction space defined therein at a location between the outer circumferential surface of the assembly intermediate race and the inner circumferential surface of the assembly outer race,
wherein when the axle shaft rotates in the first direction, the transmission assembly transmits rotation from the axle shaft to the first vane, and wherein when the axle shaft rotates in the second direction, the transmission assembly transmits less rotation to the first vane than when the axle shaft rotates in the first direction,
wherein the axle shaft is secured to one of the upper portion or the bucket, and wherein the housing is secure to the other of the upper portion or the bucket, whereby the bucket can pivot with respect to the upper portion.

14. The overhead stowage bin of claim 13 wherein the transmission assembly transmits no rotation to the first vane when the axle shaft rotates in the second direction.

15. The overhead stowage bin of claim 14 wherein the first restriction space is defined between a distal end of the first vane and the assembly inner circumferential surface of the assembly outer race.

\* \* \* \* \*